United States Patent [19]

Fletcher et al.

[11] Patent Number: 6,038,379

[45] Date of Patent: Mar. 14, 2000

[54] DATA BACKUP AND RESTORE SYSTEM FOR A COMPUTER NETWORK HAVING GENERIC REMOTE FILE SYSTEM AGENTS FOR PROVIDING BACKUP AND RESTORE OPERATIONS

[75] Inventors: Douglas J. Fletcher, Longwood, Fla.; Steven Robert DeVos, Kirkland, Wash.

[73] Assignee: Seagate Technology, Inc., Scotts Valley, Calif.

[21] Appl. No.: 08/541,954

[22] Filed: Oct. 11, 1995

Related U.S. Application Data

[63] Continuation of application No. 08/150,488, Nov. 9, 1993, abandoned.

[51] Int. Cl.[7] .................................................. G06F 13/00
[52] U.S. Cl. .............................. 395/200.6; 395/200.57; 395/200.79; 395/200.3; 395/610
[58] Field of Search ...................... 395/326, 610, 395/617, 200.6, 200.3, 200.57, 200.79

[56] References Cited

U.S. PATENT DOCUMENTS

| | | | |
|---|---|---|---|
| 4,714,995 | 12/1987 | Materna et al. | 364/200 |
| 5,005,122 | 4/1991 | Griffin et al. | 364/200 |
| 5,133,065 | 7/1992 | Cheffetz et al. | 395/575 |
| 5,187,787 | 2/1993 | Skeen et al. | 395/600 |
| 5,291,585 | 3/1994 | Sato et al. | 395/500 |
| 5,301,270 | 4/1994 | Steinberg et al. | 395/326 |
| 5,339,437 | 8/1994 | Yuen | 395/700 |
| 5,485,606 | 1/1996 | Midgdey et al. | 395/610 |
| 5,544,229 | 8/1996 | Creswell et al. | 379/67 |

OTHER PUBLICATIONS

IBM Technical Disclosure Bulletin, "Centralized and Rapid Backup/Restore For Work LAN File Services/VM", vol. 35, Aug. 1992, New York, US, pp. 286–289.

Rew and Davis, "Net CDF: An Interface for Scientific Data Access", PUB Jul. 1990, IEEE Com Graphics and Appl. Mag vol. 10–4.

R.K. Rew, NetCDF User's Guide Version 1.05, Unidata Program Center, Boulder, Col., Jan. 1990 Pub.

*Primary Examiner*—Thomas C. Lee
*Assistant Examiner*—Po C. Huang
*Attorney, Agent, or Firm*—Flehr Hohbach Test Albritton & Herbert LLP

[57] ABSTRACT

A computer network having a number of workstations running disparate operating systems and a file server having a tape drive for backup and restore of data on the network. The file server runs a generic remote file system (GRFS) and workstations run GRFS agent programs which allow the GRFS file system to access data within a workstation having a given GRFS agent program. The GRFS file system interfaces with each GRFS agent program via a command/response paradigm, with the messages being structured to support the disparate operating systems for backup and restore, to allow data to be interchanged between the disparate operating systems, and to allow independent multiple users of the network to request simultaneously backup or restore.

24 Claims, 4 Drawing Sheets

DATA BACKUP AND RESTORE SYSTEM FOR A COMPUTER NETWORK HAVING GENERIC REMOTE FILE SYSTEM AGENTS FOR PROVIDING BACKUP AND RESTORE OPERATIONS

This application is a continuation of application Ser. No. 08/150,488, filed on Nov. 9, 1993, now abandoned.

BACKGROUND OF THE INVENTION

1. Field of the Invention

The present invention relates to a system for protecting data through backup and restore operations, and more particularly to backup and restore software for protecting data which is processed on a computer network

2. Description of the Related Art

In order to ensure that original data stored on a medium such as a disk is not lost or damaged, a copy of that data is stored on another medium. Should the original data be lost or damaged, then the copy may be accessed to reproduce the original data. This process of copying and reproducing is generally known as backup and restore. Typically, original data are stored on a hard or floppy disk of a computer disk drive and are backed up to and restored from tape media of a tape drive.

Backup and restore of the data are simple in a system that has a single standalone computer, having a given operating system and one or more disk drives, that interfaces with a tape drive system. A relatively simple backup and restore program can be used that interfaces with the computer operating system to backup data including files and directories stored on a hard disk to the tape drive and to restore such data from the tape drive onto the hard disk.

Computer networks have evolved and this has placed greater demands on backup and restore systems. A computer network may include a number of computers each with its own hard and/or floppy disk drive, all of which are networked together on a common bus. For example, the computers on the network may include one or more workstations and one or more file servers, each with its own hard disk drive. The file server may also have a tape drive upon which to backup and restore its own data as well as data stored on the disk drives of the workstations on the network. Backup and restore operations are still relatively simple for a computer network in which each workstation is running the same operating system or environment, such as that known as DOS. However, computer networks exist in which workstations and file servers on the network may be running disparate operating systems. For example, a computer network may have, or may be expanded to have, workstations running different operating systems including those known as DOS, Windows, OS/2, Macintosh, and UNIX. The computer network also may have, or may be expanded to have, file servers running networking operating systems software, including those known as NetWare, Lotus Notes, and LAN Manager.

In one particular example, a computer network having workstations and a file server running disparate operating systems may be supported by NetWare, which is an operating system made and sold by Novell, Inc. of Provo, Utah. NetWare is designed to manage the programs and data among several computers on a network, unlike, for example, DOS, which is an operating system for standalone personal computers. Novell also provides, for example, SBACKUP software, which is a NetWare Loadable Module (NLM) that can be loaded onto a NetWare file server to backup data to and restore data from a tape storage device attached to the NetWare server. SBACKUP has limited capabilities; for example, it is designed to backup and restore only NetWare server data and workstations running DOS, OS/2, and Windows.

The difficulty in providing backup and restore operations to protect data on a computer network obviously increases as more and more disparate operating systems are added to the network via the computers on which they run.

In general, prior backup and restore systems for computer networks are limited to the number of different types of operating systems that can be supported. This places expansion limitations on the network in terms of adding computers running additional types of operating systems. Also, these backup and restore systems do not have the capability of interchanging data between different operating systems. Furthermore, bottlenecks occur and productivity is limited with prior backup and restore operations since multiple users cannot simultaneously request these operations.

SUMMARY OF THE INVENTION

The present invention provides a backup and restore system for use on a computer network having computers running disparate operating systems. Backup and restore software has modules including a backup engine containing, among other components, a generic remote file system (GRFS file system) and GRFS agents, being loadable on a computer network having a plurality of computers including, for example, at least one file server and at least one workstation. The GRFS file system may run on one computer, e.g., the file server of the network, and each GRFS agent may run on another computer, e.g., a workstation, on the network. The GRFS file system running on the one computer, i.e., the file server in this example, is allowed to access a file system of the other computer via the GRFS agent on that other computer to backup and restore data on that computer.

The GRFS file system and each GRFS agent interface with one another over the computer network by a set of defined messages. This messaging system is based on a command/response paradigm, such that the GRFS file system will send a given GRFS command message to a given GRFS agent and wait for a GRFS response message from the GRFS agent in order to backup or restore data. These messages are defined structurally in a manner that enables (1) backup and restore of data for a wide variety of disparate operating systems, (2) data to be interchanged between the different operating systems, and (3) simultaneous request for backup or restore by independent multiple users of the computer network.

Consequently, with the present invention, a computer network can be expanded to support computers running the major operating systems including DOS, Windows, OS/2, UNIX, and Macintosh. Also, data can be backed up from one computer, e.g., a Macintosh workstation, and restored to another, e.g., a DOS workstation, and multiple users working on the various computers in the network can simultaneously request backup and restore operations.

DESCRIPTION OF THE PREFERRED EMBODIMENTS

Figure 1:
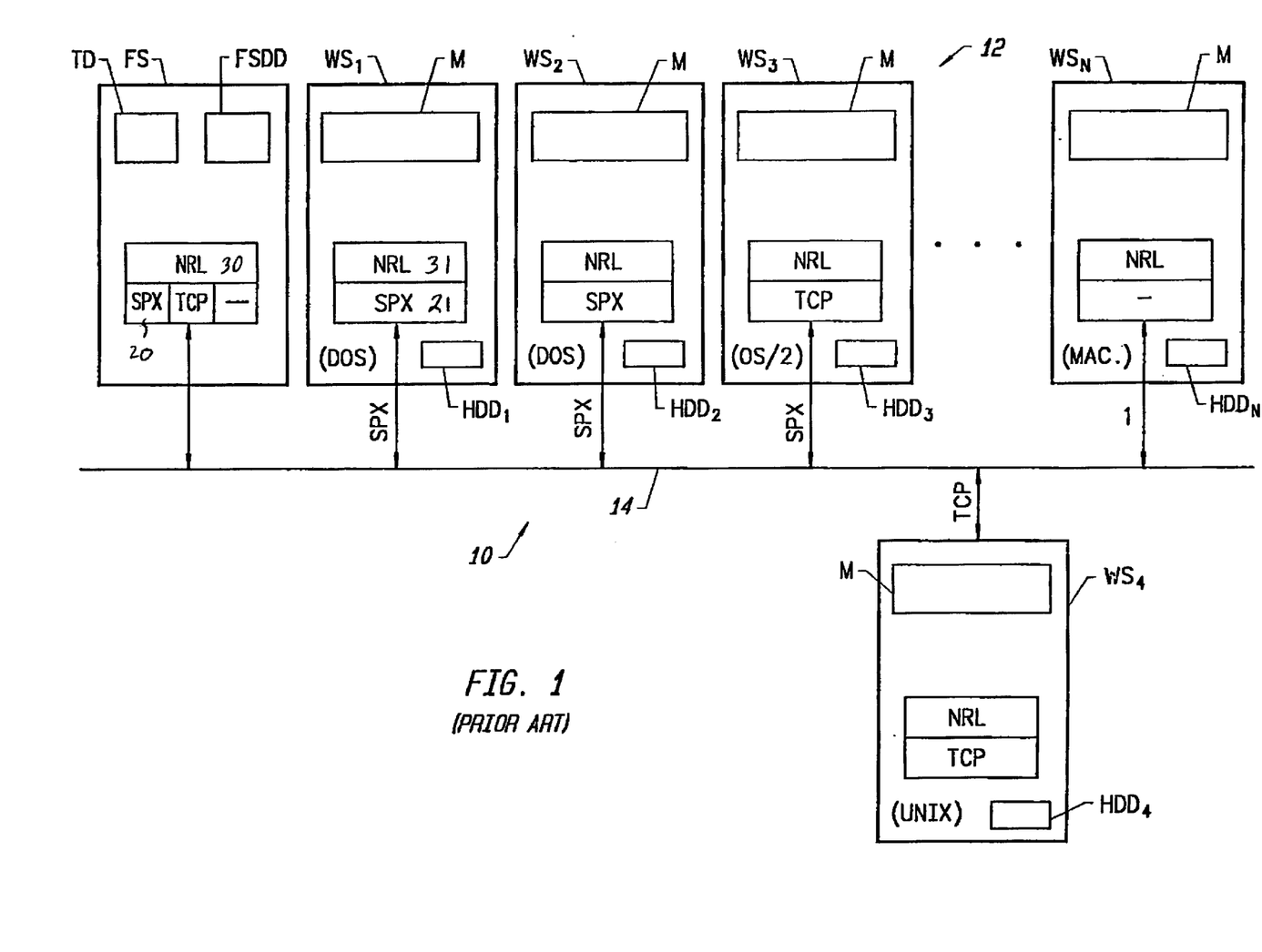
FIG. 1 is a block diagram of a prior art computer network.

FIG. 1 illustrates one example of a computer network 10 which stores, manipulates, and otherwise processes data. The network 10 has a number of computers 12 which can communicate with one another over a network bus 14. In the example of FIG. 1, the computers 12 include a file server FS and a plurality of workstations $WS_1$, $WS_2$, $WS_3$, $WS_4$, . . . $WS_n$. Each of the workstations $WS_1$–$WS_n$ has a display monitor M and the workstations $WS_1$–$WS_n$ include hard disk drives $HDD_1$–$HDD_n$. The file server FS has its own large file server disk drive FSDD and a tape drive TD upon which to backup to and restore from data on the network 10.

Every workstation $WS_1$–$WS_n$ may be running the same operating system OS, or each workstation $WS_1$ through $WS_n$ may be running a disparate operating system, or there may be disparate groups of workstations with each group running the same operating system. For example, workstation $WS_1$ and workstation $WS_2$ may both be running the operating system known as DOS, workstation $WS_3$ may be running the operating system known as OS/2, workstation $WS_4$ may be running the operating system known as UNIX, workstation $WS_n$ may be running the operating system known as Macintosh, and other workstations, not shown, or which may be added to the network 10, may run the operating system known as Windows. Furthermore, the computers 12 in the network 10 may be utilizing user interfaces such as those known as the DOS user interface, Windows graphical user interface, and a server-based NLM (NetWare Loadable Module) interface.

The computer network 10 may be, for example, running the operating system software known as NetWare 3.X or 4.X which is produced by Novell, Inc., of Provo, Utah. NetWare is designed to manage programs and data among the several computers 12 of the network 10. FIG. 1 also illustrates a portion of the NetWare software including individual network protocols SPX, TCP, and ADSP. As shown, these three protocols are associated with the file server FS, while the respective protocols are associated with each respective type of workstation. For example, NetWare supports the protocol SPX for DOS, Windows, and OS/2 workstations, and the protocol TCP for UNIX workstations. Also shown is a network resource layer (NRL) which is an interface module which provides for accessing network messages and advertising resources available on the network 10.

The general operation of a computer network 10 including one that is running NetWare is well-known. As one brief example of the operation, a user who is using a workstation $WS_1$–$WS_n$ may want to access data that is currently stored on the disk drive of the file server FS. Upon request by the user of, for example, DOS workstation $WS_1$, the file server FS will set up a connection and protocol via the network resource layer NRL 30, the network protocol SPX 21, and the network protocol SPX 21 and network resource layer NRL 31 of the workstation $WS_1$. Via this connection and protocol, data can then be transferred over the network 14 between the file server disk drive FSDD and the workstation $WS_1$ disk drive $HDD_1$ for processing by that user.

Figures 2, 3:
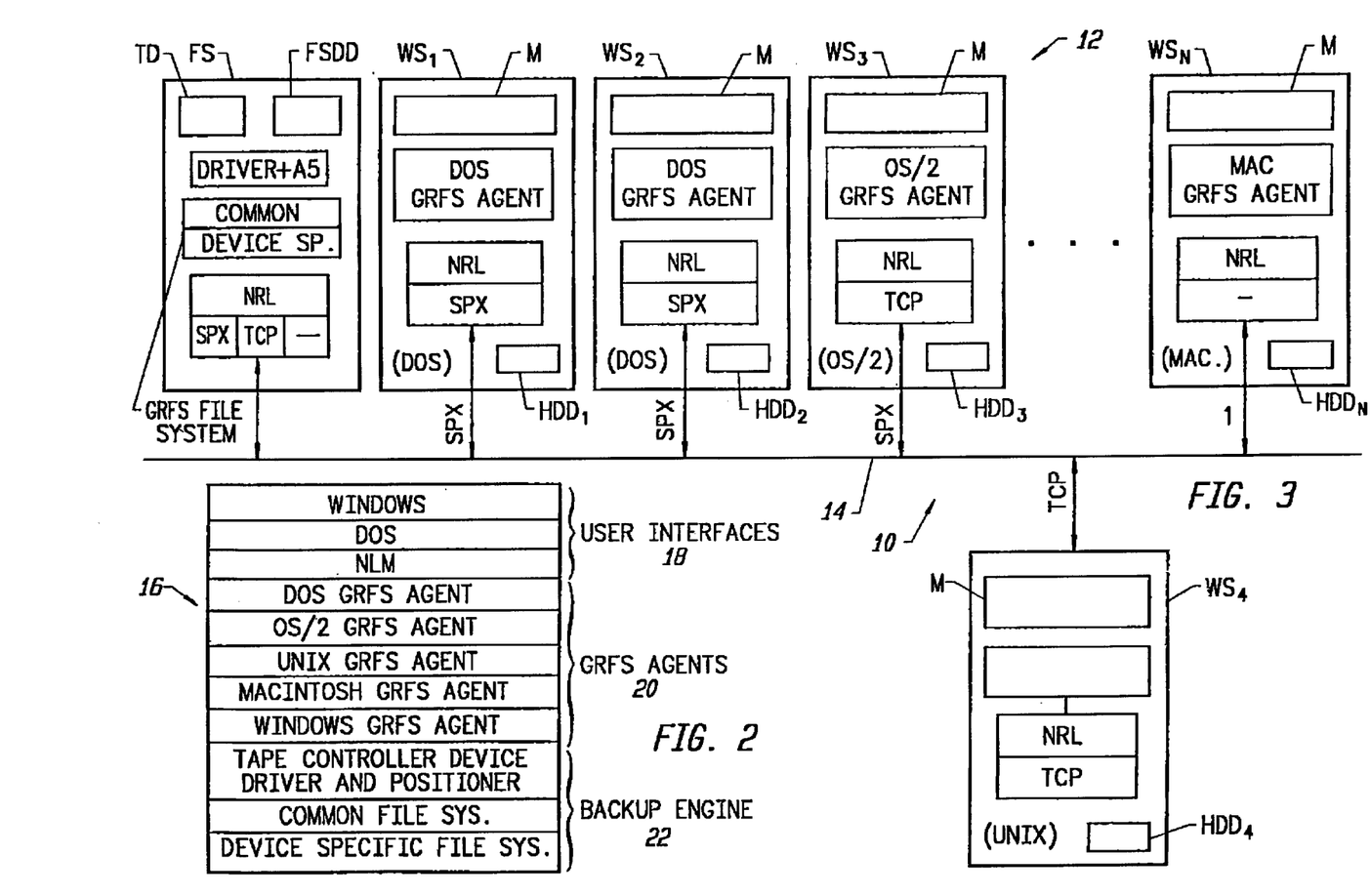
FIG. 2 illustrates backup and restore software of the present invention.
FIG. 3 is a block diagram of the computer network of FIG. 1, but having installed the backup and restore software of the present invention.

FIG. 2 illustrates a software package 16 of the present invention. In the specific embodiment, the package 16 is a NetWare Loadable Module (NLM), which, therefore, can be loaded onto NetWare. The package 16 includes multiple user interfaces 18, including a Windows graphical user interface, a DOS interface, and a server-based NLM interface. The package 16 also include GRFS agents 20 including, respectively, DOS, OS/2, UNIX, Macintosh, and Windows agents. Each agent 20 is a respective program designed to run on a computer 12 having the corresponding operating system in order to access the file system of that given computer. Thus, for example, the DOS GRFS agent 20 will run on a DOS workstation $WS_1$, the OS/2 GRFS agent will run on the OS/2 workstation $WS_2$, etc. The package 16 also has a backup engine 22 running on the file server FS and includes a tape controller device driver and tape positioner to control the mechanical operation of the tape drive TD, a common file system, and at least one device specific file system. The latter is a GRFS file system which interfaces with GRFS agents 20 via messages described in more detail below.

FIG. 3 illustrates the network 10, but modified to include the software 16. As shown, the backup engine 22 is installed at the file server FS, while the DOS, OS/2, UNIX, and Macintosh GRFS agents are installed on the respective workstations $WS_1$–$WS_2$, $WS_3$, $WS_4$, and $WS_n$. In this example, the computer network 10 does not have a computer 12 running a Windows operating system. Should the network 10 be expanded to include a Windows workstation, then the Windows GRFS agent of the software 16 would be installed at that workstation. While not specifically illustrated, a workstation user also can opt to have installed one of the user interfaces 18 for tape backup and restore purposes, that is the same as that already on a workstation for other purposes.

As indicated above, a GRFS agent is a program which runs on a network computer such as the given workstation WS, and which allows the GRFS file system running on another computer, such as the file server FS, to access the file system within the given GRFS agent's computer. This access is accomplished by use of an interface between the GRFS file system and the given GRFS agent over the network bus 14. Specifically, the interface is defined by a set of GRFS messages which are documented in detail as described more fully below. The GRFS messages include GRFS command messages that are produced by the GRFS file system and GRFS response messages produced by the given GRFS agent.

The GRFS messages are based upon a simple command/response paradigm. For backup or restore, the GRFS file system of the file server FS sends a command message over bus 14 to a given GRFS agent of the workstation WS and then waits for that agent to respond over bus 14 with a GRFS response message. A GRFS agent does not send a GRFS response message without first receiving the corresponding GRFS command message from the GRFS file system.

There are several characteristics of the GRFS messages that allow independent multiple users on the network 10 to simultaneously request backup and restore of data, allow for backup and restore of almost all types of disparate workstation and file server operating systems, and allow data to be backed up from a GRFS agent running on one operating system and be restored to a GRFS agent running on a different operating system. However, before these message characteristics are further described, an overview of the message structures will first be given. Reference should be made below under the heading "Specific Description of Command/Response Messages" for a detailed description of the message structures.

All GRFS messages (command and response) are structured to begin with the same four fields. These four fields of the common structure are as follows:

> msg_type: This UINT8 field contains the command or status id number.
> reserved: This UINT8 field is not currently used.
> retcode: This UINT16 field is used by GRFS status messages to hold the return code of the GRFS command.
> request_id: This UINT32 field contains a value which is generated by the GRFS file system for GRFS command messages and must be returned unchanged in the corresponding GRFS response message.

In the detailed description of the specific GRFS messages below under the heading "Specific Description of Command/Response Messages", the number of parameters associated with a given GRFS agent is assumed not to include the above GRFS common message header. The messages use two major structures to define GRFS objects. These two major GRFS object types are a drive list element (DLE) objects, which are logical devices, and file system objects, which are files and directories. The GRFS messages use DLE structures to reference drive list element objects and DBLK (descriptor block) structures to reference file system objects.

A DLE is a structure that contains information about individual data storage devices which can be accessed for backup and restore. The DLE structure contains the following types of information: logical device name, access password, file system delimiter, etc.

A DLE structure also supports a hierarchical structure. A DLE can be a "parent" DLE and can have "children" DLEs associated with it. For example, this is the case for a Novell server file system. For a Novell server, a DLE structure is created which is associated with the server and then DLEs for each volume on the server are created. The same situation can occur with a GRFS agent should that agent advertise or publish on the network 10 the workstation name as a DLE and then use children DLEs to advertise individual areas which can be accessed as logical units.

Security considerations such as passwords and user names may be enforced at each DLE level within a hierarchical structure. This means that a single GRFS agent can advertise on the network 10 a workstation name with multiple children DLEs and each child DLE would have a unique password.

While DLEs contain information about individual storage devices, a DBLK structure contains information about specific file system objects, which are the things in the file systems that are actually backed up and restored. As already mentioned, these objects include files and directories. The contents of a DBLK structure include items such as: the object's type, the object's name, and the object's attributes. A DBLK structure can also contain operating software specific information.

There are several other aspects of a DLE structure and a DBLK structure to discuss. A DLE does not have both children DLEs and file system objects associated with it. In other words, if a GRFS agent advertised itself over the network 10 as a "workstation", as will be described further below, and had a child DLE for each disk drive at the workstation, then the workstation DLE will have no file system objects associated with it. This is because the backup application descends to the bottom of DLE trees before attempting to find any objects. Most GRFS agents will support multiple levels of DLEs, but if the file system of the agent platform is very flat, i.e., there are no sub-devices and all objects can be enumerated with a single handle, then a single level DLE structure will suffice.

A DBLK structure has a common structure area followed immediately by the variable length DBLK data area. The DBLKs are limited to a maximum of 1,024 bytes in the specific embodiment, which means that the sum of the space required for the DBLK common structure and the data area is at most 1,024 bytes. Furthermore, there are several fields within the DBLK structure, which are actually pointers to information within the DBLK data area. These pointers are generated as offsets from the beginning of the DBLK structure. For example, if the DBLK common area is 80 bytes long and the first item within the data area is the object's name, then the object name field would be set to 80 in order to point to the first byte following the DBLK common structure. The individual fields within the common DBLK structure that are manipulated by the GRFS agent programs are described in detail below under the heading "DBLK Fields".

In order to implement a backup and restore function for a given computer 12, that computer 12 should advertise its capability for this purpose. Not every computer 12 in the network 10 is necessarily running a GRFS agent program so as to be able to have its data backed up. Consequently, the GRFS agent programs will "advertise" their capability as a GRFS agent over the network 10. This may be accomplished using the NRL resource advertisement function. The GRFS agent resource advertisement publishes the logical name of the particular agent's root DLE, as well as various flags which are used by the GRFS file system to control access to the GRFS agent. The format of the GRFS agent advertisement structure is as follows:

```
struct grfs_ws_adver_struct
{
    CHAR major_ver;
    CHAR minor_ver;
    CHAR agent_type;
    CHAR flags;
    CHAR name [MAX_WORKSTATION_NAME_LEN];
}
```

GRFS agents use character representations of the values in the version and flags fields. For example, the major.minor version of a particular GRFS agent might be 1.3, so that agent would advertise the version numbers as "1" and "3", respectively.

The GRFS major version number is used to control which GRFS agents can be accessed by the GRFS file system. The GRFS major version number of the GRFS file system and the GRFS agent must match exactly or no information of the existence of that GRFS agent will be given. The GRFS minor version number may be used for informational purposes only.

The agent_type field is used to define the type of GRFS agent. For example, the following values may be defined for this field:

| | |
|---|---|
| DOS | 1 |
| OS2 | 2 |
| MACINTOSH | 3 |
| UNIX | 4 |

The GRFS flags field is a bit-mapped value with the following flags currently defined:

GRFS_WS_PASSWORD_REQ 0x01
GRFS_WS_USER_REQ 0x02

Combining all the GRFS resource advertisement fields leads to the following examples of GRFS agent advertisements:

| NRL Resource | Decoded As |
|---|---|
| "1211RATBOY_486" | major version = 1 |
| | minor version = 2 |
| | DOS agent |
| | no user name required |
| | password required |
| | DLE name = "RATBOY_486" |
| "1020SLEDGEHAMMER" | major version = 1 |
| | minor version = 2 |
| | OS/2 agent |
| | no user name required |
| | password required |
| | DLE name = "SLEDGEHAMMER" |
| "0043ONE_WOLF" | major version = 1 |
| | minor version = 2 |
| | Unix agent |
| | user name required |
| | password required |
| | DLE name = "ONE_WOLF" |

Figure 4:
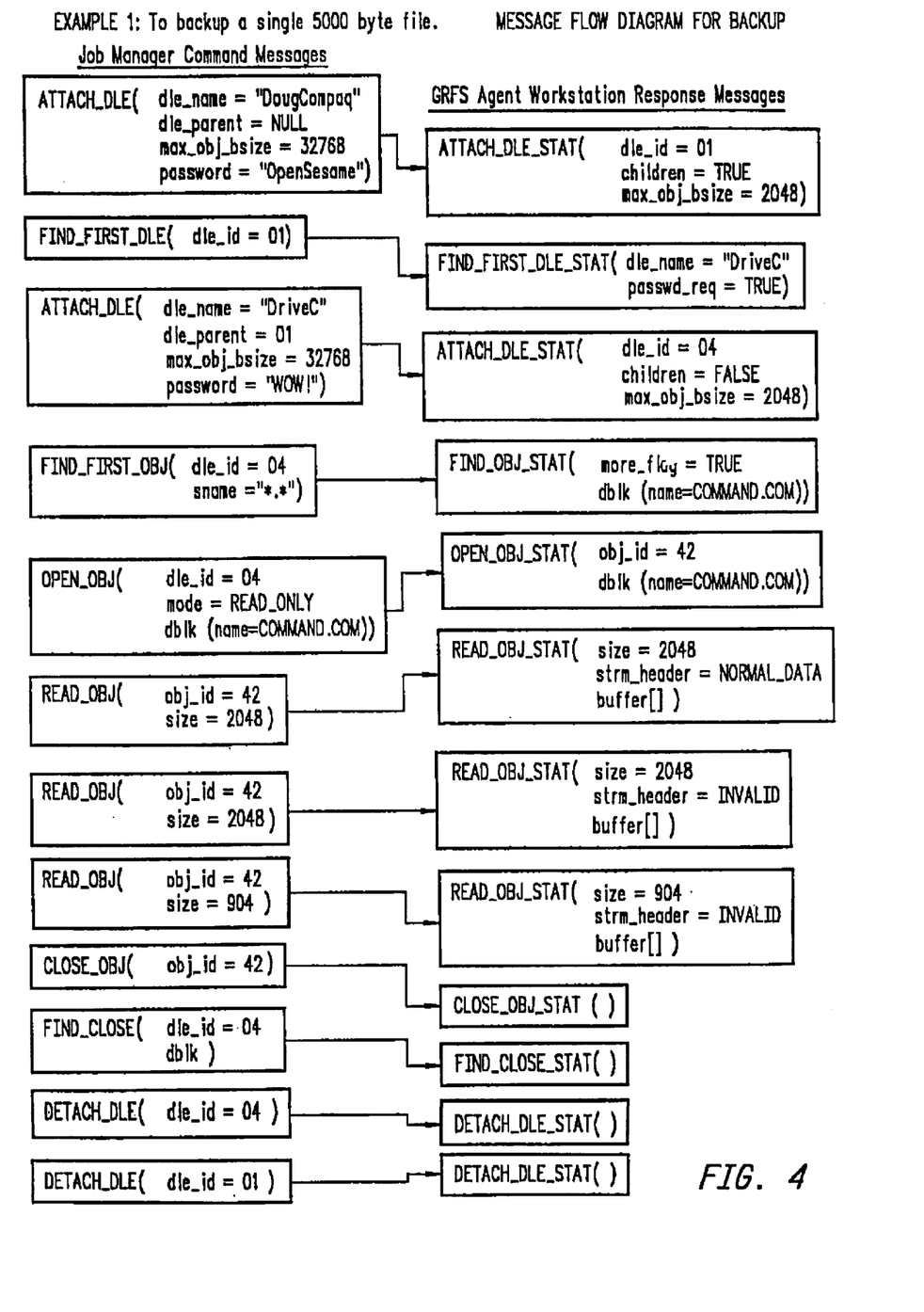
FIG. 4 is a simplified message command/response sequence diagram used to explain the backup of a given amount of data.

FIG. 4 illustrates a sequence of GRFS command and response messages in simplified form to backup data on the tape drive TD of the file server FS. This FIG. 4 gives the example of backing up a 5000 byte file named COMMAND.COM which is stored on a "DRIVEC" of a given workstation named "DougCompaq". It is assumed that the given workstation WS has advertised over the network 10 sufficient information so that the GRFS file system can create the first command message shown in FIG. 4 as ATTACH_DLE(.

To begin the 5000 byte backup, the workstation user will, via a given user interface 18, cause a display on a monitor M of devices and subdevices. The user will then select a given subdevice (e.g., DRIVEC in the example of FIG. 4), resulting in the user interface displaying on monitor M names of various files and directories. The user will then select the file name to be backed up (COMMAND.COM in the example) resulting in the submission of a tape backup job for the file server FS in the network 10.

Next, the sequence of GRFS file system command messages and GRFS agent response messages will occur as shown in order in the simplified FIG. 4. The sequence, as illustrated, commences with the GRFS command message ATTACH_DLE (naming "DougCompaq" (dle.id=01) and completes with the final GRFS agent response message DETACH_DLE_STAT( ) by which DougCompaq (dle.id=01) is detached. Thus, the file COMMAND.COM will be read from DRIVEC and written onto the tape drive TD of the file server FS for network 10.

Figure 5:
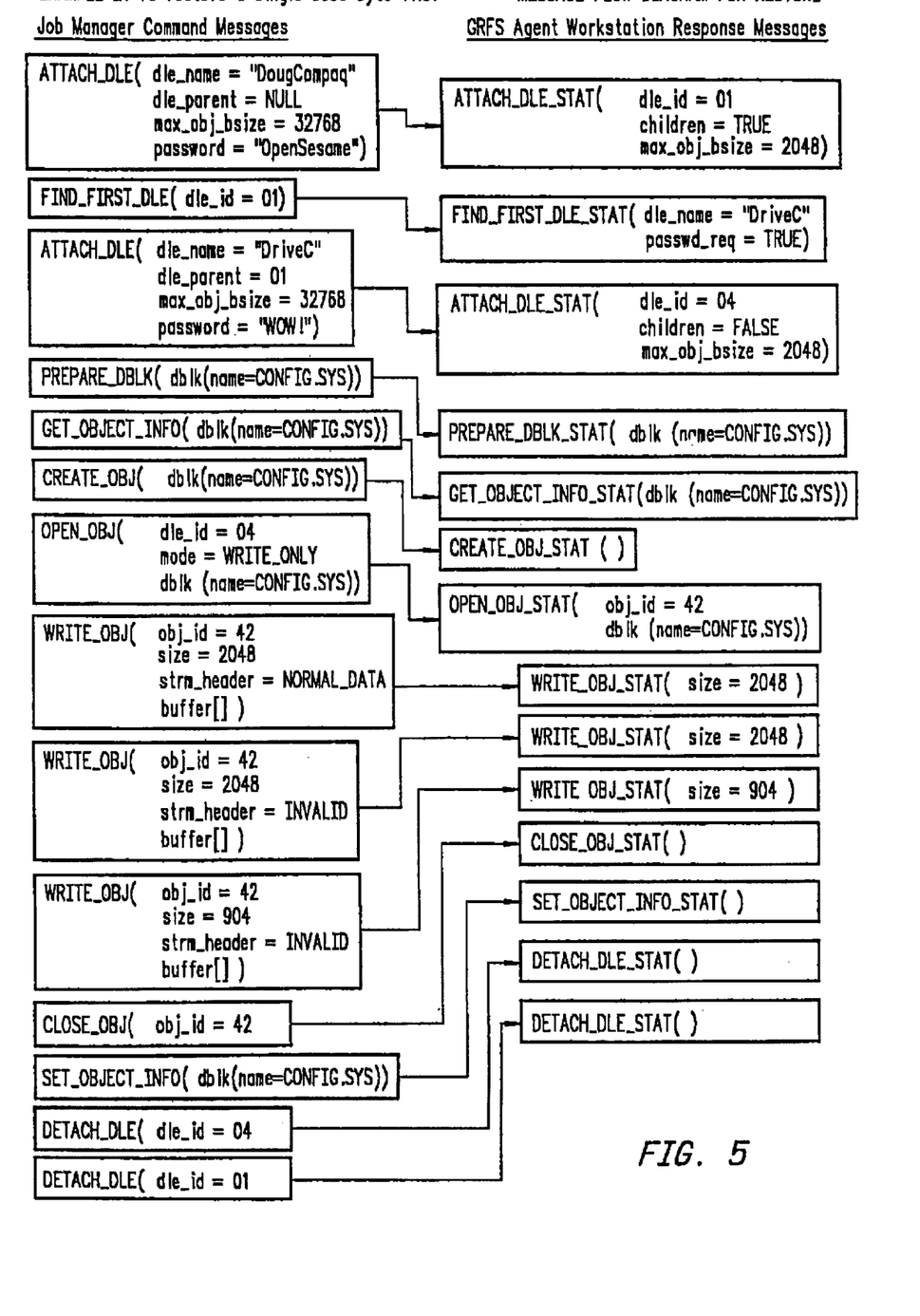
FIG. 5 is a simplified message command/response sequence diagram used to explain the restoration of backed up data.

FIG. 5 shows a sequence of GRFS command/response messages to restore information backed up on the file server FS of the network 10. In this example, it is assumed that a 5000 byte file named CONFIG.SYS has been backed up from a given workstation and is to be restored to DRIVEC of the workstation DougCompaq. After the workstation user has selected the file CONFIG.SYS using the user interface to select the file CONFIG.SYS for restore, the sequence of GRFS command/response messages will proceed as shown in FIG. 5. The sequence begins with the GRFS command message ATTACH_DLE (and completes with the GRFS response message DETACH_DLE_STAT( ). The file CONFIG.SYS will be read from the tape drive TD and restored onto DRIVEC.

As mentioned previously, the command/response messages are structured such that objects such as files and directories may be backed up from a GRFS agent running one operating system, e.g., OS/2, and restored to a GRFS agent running another operating system, e.g., DOS. This is accomplished by the messages containing a structure GRFS_STREAM_INFO. This structure has the following definition:

```
struct GRFS_STREAM_INFO {
    UNET32    id;
    UNET16    fs_attrib;
    UNET16    tf_attrib;
    UNET64    size;
}
```

When the backup application is reading an object, the GRFS_READ_OBJ_STAT response message contains a GRFS_STREAM_INFO structure. The GRFS agent program must set the id field of the first GRFS_READ_OBJ_STAT response message of each individual data stream to the appropriated value for the agent's particular operating system. Succeeding GRFS_READ_OBJ_STAT messages for the stream must have the stream header id field set to 0 (STREAM_INVALID). The data in the stream info structure is used by the backup application's tape format module and is written to the backup media of tape device TD. A well-known Microsoft Tape Format Version 1.0 Specification describes stream header structures and also contains a list of pre-defined stream header id values. The size field must be set to the number of bytes contained in the succeeding data stream and should only be set in the first stream header structure for a particular data stream, i.e., if the stream header id value is 0, then the size field does not need to be set.

An example is presented below of what a Macintosh GRFS agent would return in the GRFS_READ_OBJ_STAT messages when a file with a 2000 byte resource fork and a 4000 byte data fork is being backed up. This example also assumes that a GRFS data buffer limit is 1000 bytes.

| | |
|---|---|
| strm_header.id=STRM_MAC_RESOURCE | (returns 1st 1000 bytes of resource fork) |
| strm_header.size=2000 | |
| strm_header.id=STREAM_INVALID | (returns last 1000 bytes of resource fork) |
| strm_header.size=0 | (returns 1st 1000 bytes of data fork) |
| strm_header.id=STRM_NORMAL_DATA | |
| strm_header.size=2000 | (returns next 1000 bytes of data fork) |
| strm_header.id=STREAM_INVALID | |
| strm_header.size=0 | (returns next 1000 bytes of data fork) |
| strm_header.id=STREAM_INVALID | |
| strm_header.size=0 | (returns last 1000 bytes of data fork) |
| strm_header.id=STREAM_INVALID | |
| strm_header.size=0 | |

When the backup application is restoring an object, the GRFS commands (GRFS_WRITE_OBJ, GRFS_VERIFY_OBJ) will also contain a GRFS_STREAM_INFO structure. The GRFS agent must examine the stream header id value to determine whether the data stream type is supported on the agent's operating system platform. If the data stream type is not supported the GRFS agent should set the response message retcode to FS_DONT_WANT_STREAM. This will cause the backup application to skip to the next data stream or the next object if at the last data stream for a particular object. For instance, if an object was backed up from an OS/2 agent which supports a normal data stream, an extended attribute (EA) data stream, and an access control list (ACL) data stream, then if the object is restored to a DOS agent, the DOS agent will return FS_DONT_WANT_STREAM when it receives GRFS_WRITE_OBJ commands with stream header id values that indicate either EA or ACL data streams are being restored since this data is not supported by DOS. The DOS agent will accept the normal data stream which it does support. Thus, this functionality allows objects to be backed up from an agent running on one operating system and restored to an agent running on another operating system.

As also mentioned above, the message structure is defined as well, such that backup and restore can be supported with respect to most operating systems, including the current major operating systems which are DOS, OS/2, Macintosh, Windows, and UNIX. Each operating system will have its own data structures aligned differently from one another. For example, one operating system may have a 1-byte alignment where a data byte may be placed anywhere, whereas another operating system may have a 2-byte alignment where a data byte may be placed in either an even or odd byte location. Other operating systems, for example, may have what is known as a 4-byte alignment. The GRFS messages are defined with a "least common denominator" alignment that would apply to the above-noted major operating systems. Thus, for example, a given network 10 which may include workstations running only DOS, OS/2, and Macintosh, may be expanded to include a workstations running UNIX and/or Windows. In other words, the present invention supports a scalable network for backup and restore purposes from a small or departmental local area network (LAN) to a large or enterprise wide area network (WAN).

Furthermore, the message structure enables multiple users working at multiple computers 12 on the network 10 to request simultaneously backup and restore of objects. This structure enables the GRFS file system to create a unique request id for every GRFS command message. Consequently, the GRFS file system can communicate simultaneously with multiple GRFS agents and, therefore, multiple users of the network 10 who at the same time want to have backup and/or restore operations performed. The present invention will manage these requests such that they are placed in a job queue in the file server FS, thereby allowing each user to operate independently from any other user on the network 10 and without waiting access to the backup and restore system.

While each user can independently manage his/her own data on a given workstation, backup and restore of data on the entire network 10 can be centrally managed at a single location by, for example, a network administrator, from a given workstation or file server, or a system console.

The remaining portion of this specification describes in much more detail the structure of the command/response messages, followed by a detailed description of the individual fields of the GRFS common DBLK structure which may be manipulated by GRFS agent programs.

What is claimed is:

1. A computer system, comprising:
    a plurality of computers connected to a computer network, each of the computers having a file system and a generic remote file system (GRFS) agent associated with an operating system running on a particular computer, a subset of said computers running disparate operating systems; and
    a file server connected to the computer network, the file server having a GRFS file system that communicates through an operating system independent message protocol with each GRFS agent, the protocol including command instructions that locate and retrieve backup data stored in any file system associated with a GRFS agent and command instructions that locate and restore backup data to a file system;
    wherein each GRFS agent communicates through the operating system independent message protocol that includes response instructions to the command instructions, the response instructions providing information that enables the GRFS file system to locate and retrieve backup data and to locate and restore the backup data.

2. The apparatus of claim 1, further comprising:
    a plurality of secondary computers connected to the computer network, each of the secondary computers having a file system and no GRFS agent.

3. The apparatus of claim 1, further comprising:
    each GRFS agent including instructions to backup data stored in a first file system associated with a first computer having a first GRFS agent associated with a first operating system onto a second file system associated with a second computer having a second GRFS agent that is associated with an operating system that differs from the first operating system, and instructions to restore the stored data in the second file system back to the first file system.

4. The apparatus of claim 1,
    wherein each file system is characterized by a set of logical resources and a set of file system objects, the set of logical resources represented as a hierarchical structure including one or more levels of logical resources, each logical resource having zero of more child logical resources, a first level including a root logical resource representing the file system, the hierarchical structure including one or more paths, each path including one or more logical resources such that each logical resource at each subsequent level is a child of a logical resource at a preceding level.

5. The apparatus of claim 4, further comprising:
    said file server including instructions to attach to the root logical resource of a file system requesting a backup operation for selected backup data; and
    each GRFS agent associated including instructions to receive the attach instructions and to return to the file server a logical device identifier associated with the root logical device.

6. The apparatus of claim 5, further comprising:
    the file server including instructions to search each path of logical resources residing in a requesting computer for a file system object that represents the backup data; and
    each GRFS agent including instructions to receive the search instructions and to return zero or more identifiers of child logical resources in order to enable the file server to traverse a path and to return zero or more file system objects associated with a particular path.

7. The apparatus of claim 6, further comprising:
    the file server including instructions to obtain access to a file system object representing the backup data; and
    each GRFS agent including instructions to receive the access instructions, to coordinate access to the backup data with zero or more processes having concurrent access to the backup data, and to respond to the file server when such access is obtained.

8. The apparatus of claim 7, further comprising:

the file server including instructions to read the backup data; and each GRFS agent including instructions to transmit the backup data to the file server.

9. The apparatus of claim 4, further comprising:

the file server including instructions to create a file system object for data residing in the file server that is to be restored to a requesting computer; and each GRFS agent including instructions to receive the create instructions and to create the file system object in the file system of the requesting computer.

10. The apparatus of claim 9, further comprising:

the file server including instructions to write data from the file server to a requesting computer;

each GRFS agent including instructions to receive the write instructions and to store the write data in the file system of the requesting computer.

11. A computer-implemented method for retrieving data in a computer system including one or more primary computers and at least one file server connected to a computer network, each primary computer and the file server having a respective file system, the file server having a generic remote file system (GRFS), each primary computer having disparate file systems and a GRFS agent, the GRFS agent and the GRFS file system communicating through an operating system independent message protocol, said method comprising the steps of:

representing data in each file system as one or more file system objects, each file system object including information describing the data in a uniform format;

selecting data stored in a first primary computer for backup to the file server;

establishing a logical connection from the file server to the file system of the first primary computer;

searching for the file system object representing the backup data in the first primary computer;

obtaining access by the file server to the file system object representing the backup data;

transmitting the backup data to the file server; and disconnecting the logical connection from the file server to the file system of the first primary computer;

wherein at least said establishing, searching, and obtaining steps are facilitated by said operating system independent message protocol.

12. The method in claim 11, further comprising the steps of:

selecting the backup data for transmission from the file server to the first primary computer;

establishing a logical connection from the file server to the file system of the first primary computer;

generating in the first primary computer a file system object representing the backup data;

obtaining access by the file server to the file system object representing the backup data;

transmitting the backup data to the first primary computer; and disconnecting the logical connection from the file server to the first primary computer.

13. The method of claim 11, further comprising the step of:

representing each file system as a set of logical resources represented as a hierarchical structure including one or more levels of logical resources, each logical resource having zero of more child logical resources, a first level including a root logical resource, the hierarchical structure including one or more paths, each path including one or more logical resources such that each logical resource at each subsequent level is a child of a logical resource at a preceding level.

14. The method of claim 13, said establishing step further comprising the steps of:

transmitting a first command message from the file server to the first primary computer requesting to attach to the root logical resource of the first primary computer; and transmitting a first reply message from the first primary computer to the file server indicating an identifier for the root logical resource.

15. The method of claim 13, said searching step further comprising the step of traversing each path of the hierarchical structure representing the file system of the first primary computer to find a file system object representing the backup data.

16. The method of claim 15, said searching step further comprising the steps of:

(i) transmitting one or more second command messages from the file server to the first primary computer requesting a child logical resource associated with a particular logical resource;

(ii) transmitting one or more second reply messages from the first primary computer to the file server indicating zero or more child logical resources associated with the particular logical resource;

(iii) when a second reply message indicates no child logical resources are associated with a particular logical resource, transmitting one or more third command messages from the file server to the first primary computer requesting file systems objects that can represent the backup data that are associated with the particular path traversed; and (iv) transmitting one or more third reply messages from the first primary computer to the file server indicating one or more file system objects.

17. The method of claim 16, searching for a file system object representing the backup data;

when a third reply message does not return a file system object for the backup data, repeating steps (i) and (iv) until the file system object representing the backup data is found.

18. The method of claim 11, said obtaining step further comprising the steps of:

transmitting a fourth command message from the file server to the first primary computer indicating an intended access to the file system object; and transmitting a fourth reply message from the first primary computer to the file server indicating that the intended access is permitted.

19. The method of claim 11, said transmitting step further comprising the steps of:

transmitting one or more fifth command messages requesting data to be read from a data location associated with the file system object representing the backup data; and transmitting one or more fifth reply messages returning the requested data.

20. The method of claim 11, wherein the computer system includes a plurality of secondary computers connected to the computer network, each said secondary computer having a file system that is compatible with another secondary computer or one of said primary computers.

21. The method of claim 11, further comprising the step of:

prior to said selecting step, notifying the file server that a particular one of the primary computers requires data from the particular primary computer to be backed up in the file server.

22. The method of claim 21, said notifying step further comprises the step of providing the file server with a root logical device identifier of the file system associated with the particular primary computer.

23. The method of claim 11, further comprising the steps of:

selecting data stored in a first primary computer for backup to a second primary computer;

establishing a logical connection from the second primary computer to the file system of the first primary computer;

searching for the file system object representing the backup data in the first primary computer;

obtaining access by the second primary computer to the file system object representing the backup data;

transmitting the backup data to the second primary computer; and disconnecting the logical connection from the second primary computer to the first primary computer.

24. The method in claim 23, further comprising the steps of:

selecting the backup data for transmission from the second primary computer to the first primary computer;

establishing a logical connection from the second primary computer to the file system of the first primary computer;

generating in the first primary computer a file system object representing the backup data;

obtaining access by the second primary computer to the file system object representing the backup data;

transmitting the backup data to the first primary computer; and disconnecting the logical connection from the second primary computer to the first primary computer.

* * * * *